Oct. 27, 1942. G. G. MORIN 2,300,264
PAPER HOLDER FOR PROJECTION PRINTING
Filed March 30, 1940 3 Sheets-Sheet 1
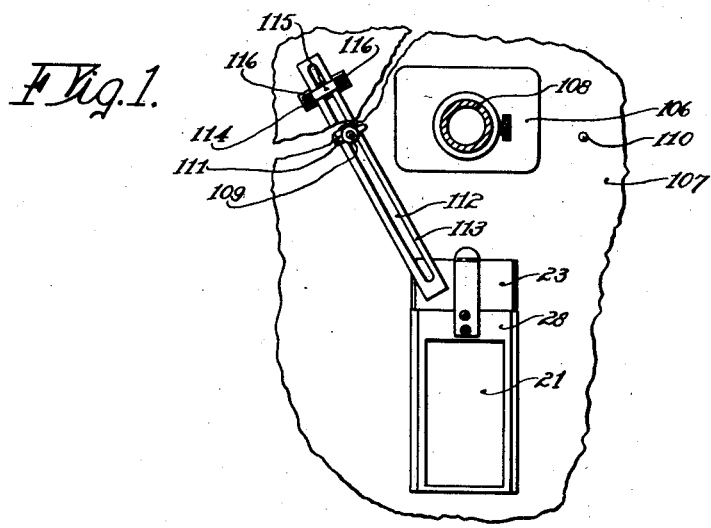
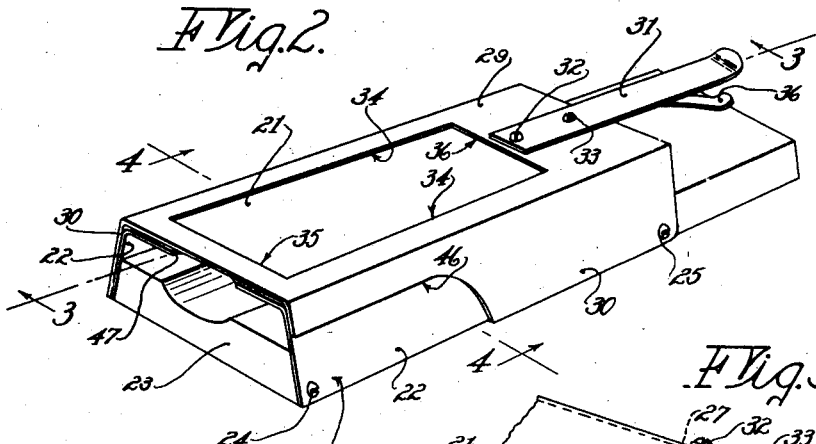
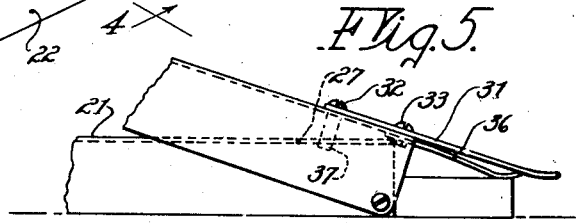
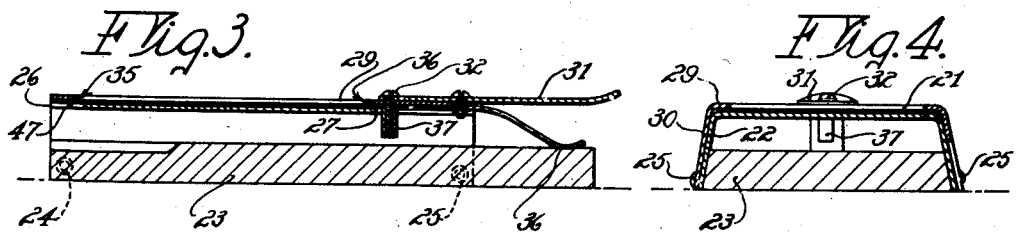
INVENTOR
GEORGE G. MORIN
BY Chapin + Neal
ATTORNEYS Oct. 27, 1942.    G. G. MORIN    2,300,264
PAPER HOLDER FOR PROJECTION PRINTING
Filed March 30, 1940    3 Sheets-Sheet 2
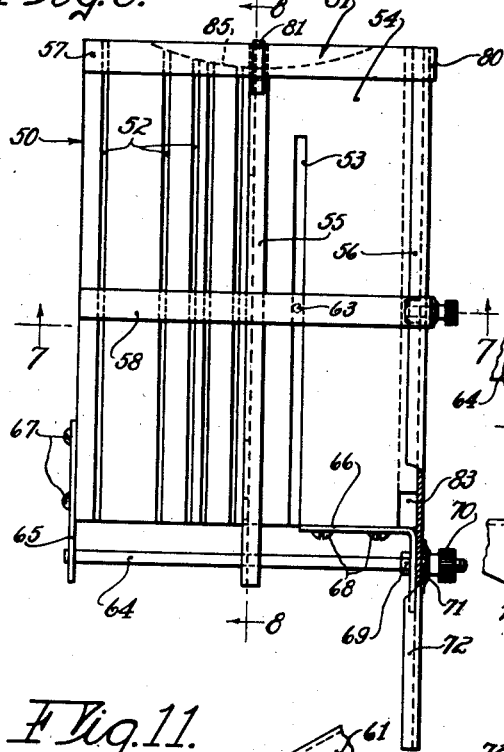
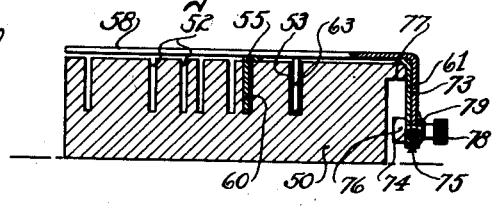
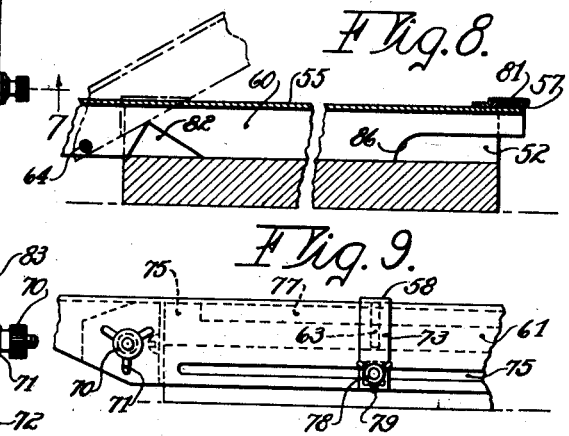
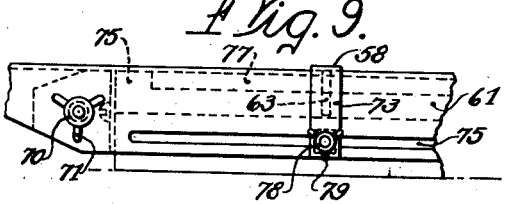
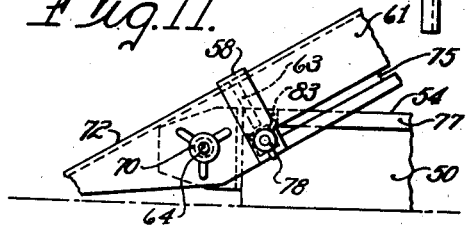
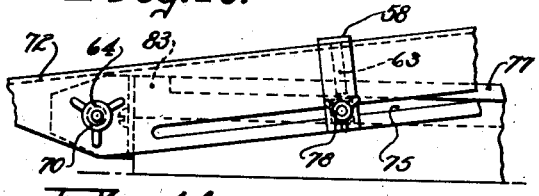
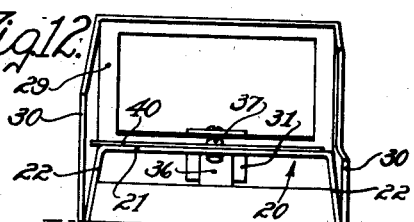
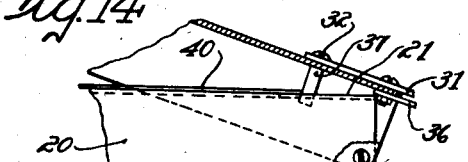
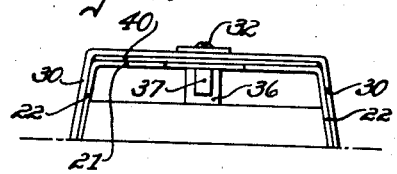
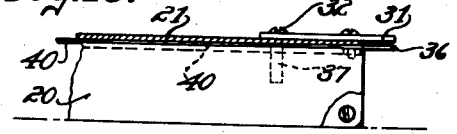
INVENTOR
GEORGE G. MORIN
BY Chapin & Neal
ATTORNEYS Oct. 27, 1942.                G. G. MORIN                2,300,264
              PAPER HOLDER FOR PROJECTION PRINTING
                  Filed March 30, 1940        3 Sheets-Sheet 3

INVENTOR
GEORGE G. MORIN
BY Chapin + Neal
ATTORNEYS

Patented Oct. 27, 1942

2,300,264

UNITED STATES PATENT OFFICE 2,300,264

PAPER HOLDER FOR PROJECTION PRINTING

George G. Morin, Holyoke, Mass.

Application March 30, 1940, Serial No. 326,921

7 Claims. (Cl. 88—24)

This invention relates to a paper holder or easel for use in the production of prints from negatives by means of projection. In doing this work the negative from which the print is to be made is placed in front of a source of light, as in a photo-enlarger, and the image focused on a piece of sensitized paper spaced from the negative. Where a large number of prints is to be made from the same negative the enlarger is left focused in one position and exposed prints replaced in succession by new sheets. In order not to waste paper and to insure good reproduction, considerable care and time must be taken to place the new sheet in the exact position in which the exposed sheet was placed. For this purpose, paper holders or easels have been proposed in which the sheet of sensitized paper is removably held.

One purpose of the present invention is to provide an improved easel for use where a large number of prints is to be produced from the same negative and which incorporates novel and useful means to center the sensitized sheets. A further purpose is to provide an easel in which the operation of securing the sheets in position on the easel automatically centers the sheets. Another object of the invention is to combine such automatically centering means with novel means to permit adjustment for various sizes of prints.

The above and other objects will appear from a reading of the specification and claims in conjunction with the accompanying drawings, in which:

Fig. 1 is a plan view showing the general arrangement of the easel positioned near the base of an enlarger;

Fig. 2 is an enlarged perspective view of the easel shown in Fig. 1;

Fig. 3 is a longitudinal section taken on line 3—3 of Fig. 2;

Fig. 4 is a section taken on line 4—4 of Fig. 2;

Fig. 5 is a fragmentary side elevation of the easel showing the position of the parts when the sensitized paper is being inserted;

Fig. 6 is a top plan view of a modified form of easel which is adjustable to accommodate different sizes of sensitized sheets;

Fig. 7 is a sectional view taken on line 7—7 of Fig. 6;

Fig. 8 is a sectional view taken on line 8—8 of Fig. 6;

Figs. 9 and 10 are fragmentary side views of the easel of Fig. 6, showing the operation of a novel mechanism to limit the opening of the easel when a new sheet is being inserted;

Fig. 11 shows the operation of the parts in Figs. 9 and 10 during adjustment of the easel for different size sheets;

Figs. 12 to 15 are views showing how the easel of Fig. 2 centers the paper;

Figure 16:
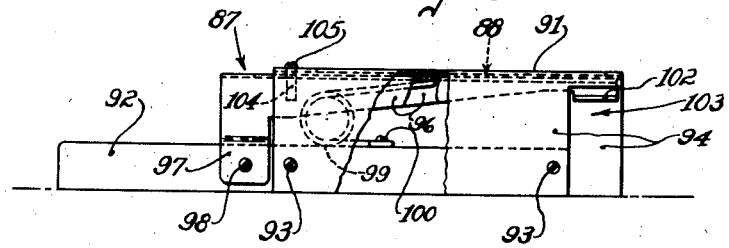
Fig. 16 is a side elevation of a modified form of easel.

Referring to Figs. 2 to 5, the easel consists of a bed 20 having a surface 21 on which a piece of sensitized paper may be supported, and which is preferably covered by a piece of unsensitized white paper to permit focusing. Bed 20 preferably has downwardly and outwardly sloping sides 22 which are secured to a base 23 by screws 24 and 25 as shown. The width and the length of surface 21 correspond substantially to that of the paper to be printed.

Superposed on the bed 20 is an apertured mask 29 exposing a portion of the surface 21 of the bed. The mask has sides 30 which preferably have an outward flare complementary to the slope of the sides 22 of the bed, and is pivoted to the bed 20 by screws 25 in a manner which will be described more specifically later on. The sides 30 are arranged so that the distance between them at their junction with the bottom surface of the mask is equal to the width of the paper to be printed. A handle 31 is attached to the mask by bolts 32 and 33 and may be depressed to rotate the mask away from the surface 21 of the bed as shown in Fig. 5 for the insertion of the sensitized paper. A repositioning means such as leaf spring 36 is attached to the mask by bolt 33 and bears on the bed, thus holding the mask in position over the surface 21 with the sides 22 and 30 of the bed and mask in nested relation when there is no pressure on the handle. The side edges 34 and front and back edges 35 and 36 of the aperture in the mask above referred to form the boundaries of an area corresponding to that of the image to be produced on the sensitized paper.

Preferably formed as a nut for bolt 32 is a stud 37 which extends downwardly below the surface 21 of the bed 20 and is located a slight distance back of the rear edge 27 (Fig. 5) of this surface. Looking at Figs. 3 and 4, this stud 37 and that portion of the inner surfaces of sides 30 above the surface 21 of the bed 20 form marginal guides for the back and side edges of the piece of sensitized paper to be printed, the latter being held in correct position on the surface 21 if its edges are in contact with the sides 30 and its back edge is in contact with the stud 37.

It is the action of these sides 30 and in particular the action of the stud 37 that constitute the most important features of my invention. Considering first the stud, it will be clear from Figs. 3 and 5 that its length is sufficient so that when the mask is raised from its normal position to the raised position of Fig. 5 the bottom of the stud is still below the back edge 27 of the surface 21. In this position the stud will form an abutment for the rear edge of a sensitized sheet placed on surface 21. When the mask is lowered the stud will move counterclockwise in an arc from the position of Fig. 5 to that of Fig. 3. In describing this arc, that portion of the forward edge of stud 37 which is at the level of the surface 21 forms an abutment which constantly advances towards the front of the mask until the mask reaches its closed position. This final position will of course always be the same. As will be clear from a consideration of the drawings, this action of the stud is due to the fact that the pivot provided by screws 25 is located in a plane below the surface 21 and back of stud 37.

The paper positioning action of the stud will be clear from Figs. 14 and 15. In placing successive sheets on the surface 21 the handle 31 is first depressed, the printed sheet is removed, an unexposed sheet 40 is placed on the surface 21 with its back edge abutting stud 37, and the mask is finally lowered. As shown in Figs. 14 and 15 the mere lowering of the mask into position causes the stud 37 to move the sheet forward to the correct front-to-back position. As will be clear also, inasmuch as the stud 37 always stops at the same forward position it is unnecessary to raise the mask more than just enough to remove the printed sheet and slip in a new one, for if the new sheet is placed against the stud 37, when the mask is lowered, the new sheet will always be advanced to the correct front-to-back position.

The paper-positioning function of the sides 30 will now be described with reference to Figs. 4, 5, 12 and 13. As was pointed out earlier, the distance between the sides 30 at their junction with the bottom surface of the mask corresponds to the width of the paper to be printed, and the sides 30 of the mask 28 are preferably flared outwardly. When the mask is being lowered from its open position of Fig. 5 to the closed position of Fig. 4 the flared sides 30 act to position a misregistered sheet laterally. This action will be clear from a comparison of the positions of the sheet 40 in Figs. 12 and 13.

As can be seen, the sides 30 and the stud 37 cooperate so that all the operator has to do is to raise the mask, slip a sheet onto the surface 21 with its back edge against the stud 37, and lower the mask, the sheet being accurately and automatically centered as the mask descends. This operation is facilitated by reason of the raised position of the surface 21, which is high enough to permit the operator to grasp the sheet between the thumb and forefinger and insert it on the surface of the bed without striking his knuckles on the supporting table.

One of the sides 30 of the mask may be cut away as shown at 46 in Fig. 2 to facilitate the insertion of a sheet by a combined longitudinal and transverse movement, which is somewhat easier than the perfectly straight insertion which would otherwise be necessary. Also a notch 47 may be provided at the forward edge of surface 21 to allow the operator to grasp the printed sheets easily.

In Figs. 6 to 11, is shown a modified form of easel structure which has a similar principle of operation but which is arranged to be adjusted to accommodate various sizes of prints. Referring first to Figs. 6 to 9, the easel consists of two main parts, the bed 50 and a mask indicated as a whole at 51. As in the previous form, the bed 50 is designed to support on its upper surface 54 a sensitized sheet to be printed, and is generally rectangular in shape. However, it has a series of narrow slots 52 as well as one wider slot 53 cut in its upper surface 54. As will appear, these slots cooperate with certain parts of the mask to permit the easel to be adjusted for different sized prints.

The mask 51 consists of two side members 55 and 56, and front and back members 57 and 58, which together form the sides of a rectangular image framing aperture. As will be explained in detail, the side member 55 is adjustable to and from member 56 and the back member 58 to and from member 57, so that the size of the aperture may be varied.

Each side member 55 and 56 is L-shaped in cross section, with the long leg of the L vertical and the short leg overlying the surface 54. The long leg 60 of member 55 extends into one of the slots 52 and the long leg 61 of member 56 lies parallel to the side edge of the bed. Depending from back member 58 into slot 53 is a stud 63. When the easel is being used for printing the long legs 60 and 61 of the members 55 and 56 form marginal guides for the sides of the sensitized sheet while the stud 63 acts as a marginal guide for the back edge of the sheet.

The mask is pivoted to the bed as follows. A pivot rod 64 is journaled in brackets 65 and 66 secured to the bed as by screws 67 and 68. The long legs 60 and 61 of members 55 and 56 are loosely journaled on the rod 64 as shown. A lock nut 69, a knurled nut 70, and a spring washer 71 serve to press the long leg 61 of member 56 frictionally against the bracket 66. Member 56 is extended backwardly to form a handle 72. When the handle 72 is depressed the member 56 will be turned about its pivot and this action will raise the mask so that a sheet of sensitized paper may be placed on the surface 54 of the bed with its back edge against stud 62. As will be plain from a comparison of Figs. 9 and 10, when the mask is lowered the stud 63 will swing in an arc to present a constantly advancing abutment to the back edge of the sensitized sheet.

For moving back member 58 forward and backward in relation to front plate 57, it is mounted to slide over the short legs of side pieces 55 and 56 and has at one end a depending leg 73 with a hole formed in the lower end. A bolt 74 passes through this hole and through a slot 75 formed lengthwise near the lower edge of the depending leg 61 of member 56. This bolt 66 has an enlarged head 76 at its inner end, which is received between the inner surface of leg 61 and the side of the bed, and underlies an overhanging ledge 77 formed on the bed. At the outer end of the bolt 74 there is provided a knurled nut 78 and a spring washer 79 for securing the back member to member 56 in any position of adjustment. As is clear from the drawings, the stud 63 slides back and forth in slot 53 as member 56 is adjusted toward and from the front member 57.

The front member 57 has a depending leg 80 which, as is shown in Fig. 6, is fixed in any suitable manner as by spot welding to the depending leg 61 of plate 56. The other side member 55, which as has been previously described, is loosely journaled on rod 64, has at its forward end a spring clip member 81 which engages member 57 in a manner to permit adjustment of member 55 along member 57 toward and from member 56 to adjust the mask for different width prints.

To move member 55 laterally from one slot 52 to another the handle 72 is depressed to raise the mask to its fully opened position, Fig. 11, and the member 55 moved laterally until its depending leg 60 is in register with the chosen slot 52. In Fig. 8 is shown an angular notch 82 cut in the lower edge of depending leg 60. This notch is provided to accommodate the back edge of the bed when the member 55 is being moved laterally. This action is shown by the dotted position of the member 55 in Fig. 8.

It will be recalled that in the first form of easel described the stud 37 which forms the back marginal guide for the print never rises high enough to allow its bottom edge to clear the surface of the bed even though the mask is raised to its maximum, and therefore that stud will always present an abutment to the back edge of a piece of sensitized paper placed on the bed. As a reference to Figs. 6, 9 and 10 will show, there is a special problem presented with this adjustable form of easel, for as the back member 58 is moved towards the front member 57 the arc described by stud 63 becomes greater for the same movement of handle 72. This means that the movement of the handle 72 has to be limited or the stud 63 might rise out of the slot 53 when back member 58 is positioned well forward. If this should happen when a fresh sheet of paper was being inserted it would slide under the stud. On the other hand, whatever means is provided to limit the raising of the mask must not prevent the mask from being raised to its fully opened position, Fig. 11, when the side member 55 is being moved from one to another of the slots 53. For this purpose the overhanging ledge 77 is positioned to cooperate with the bolt 74.

Referring to Fig. 7, the distance from the bottom surface of the ledge 77 to the enlarged head 76 of the bolt 74 is less than the depth to which the stud 63 extends into slot 53. Also, as shown in Figs. 6 and 9, the ledge stops short of the back edge of the bed, having a relieved portion 83. As shown in Figs. 10 and 11, when the back member 58 of the mask is positioned as in Fig. 6 and the mask raised by depressing handle 72, the enlarged head 76 of the bolt strikes the bottom surface of the ledge 77 and limits the upward motion of the mask as shown in Fig. 10. In this last position the stud 63 still extends below the surface of the bed and into slot 53.

This operation will take place in any of the positions of adjustment of member 58 except when the member 58 is positioned completely at the back of the slot 67, in which position the enlarged head 76 of the bolt 74 is under the relieved portion 83. With this adjustment of member 58 the mask may be raised to its highest position (Fig. 11). However, as is apparent in this last figure, the arc described by the stud 63 is so short that the stud still extends below the surface of the bed. As will be recalled, the side member 55 can be shifted laterally to a different slot 52 when the mask is thus fully opened, see Fig. 8. From the above it is evident that the ledge 77 performs the function of limiting the motion of the mask and yet the arrangement is such that the side member 58 can be adjusted.

As with the other forms of easel, the bed may be formed with a notch 85 and the side member 55 with the notch 86 to facilitate the removal and insertion of sheets. In this connection, it should be pointed out that, while in the form shown in Figs. 6 to 11 the action of the stud 63 as a marginal guide to position the back edge of the sensitized sheet is the same as with stud 37 of the easel of Fig. 2, the depending legs 60 and 61 which form the marginal guides for the sides of the sheets are shown as formed at right angles to the surface of the bed. There is therefore no means shown to line up the side edges of the sheets parallel to the side edge of the bed as the mask is lowered. However, if it is desired to provide for this action, the depending legs 60 and 61 could be made sloping and the slots 52 made triangular in cross section.

Referring now to Figs. 16 to 19, the principle of operation may be obtained by the modified easel structure shown. As with the earlier forms the easel consists generally of a bed 87 having an upper surface 88 which during the printing operation supports a sensitized sheet in position under an aperture 90 formed in the top surface of a superposed mask 91. The mask 91 is of a generally inverted U-shape in cross section and is fixedly supported in position on a base 92 by screws 93 passing through the depending sides 94. The distance between the inner surfaces of these sides 94 corresponds to the width of the print to be made and the sides form marginal guides for the side edges of the sheet.

The bed 87 is preferably longer than the mask and has depending sides 96 which fit inside the sides 94 of the mask. At the back of the bed these sides are extended downwardly and have an offset portion 97 at the bottom. The bed is pivotally secured to the base 92 by screws 98 passing through these offset portions and is held in its normal position of Fig. 16 by a coiled spring 99 secured at one end to the base 92 by screw 100 and with its free end bearing on the bottom of surface 88.

Figure 17:
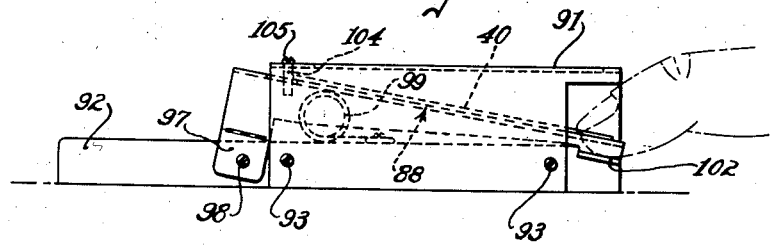
Fig. 17 shows the operation of inserting sensitized paper in the easel of Fig. 16.

At the front of the bed and formed preferably integrally with one of the sides 96 is a ledge 102 which extends laterally through a notch 103 cut in the side 94 of the mask to form a finger piece by which the bed may be depressed for the insertion of a sheet 40 in the surface 88 as shown in Fig. 17.

The bed has cut in the surface 88 near the back edge thereof a pair of slots 103. Passing through these slots 103 are studs 104 preferably formed as nuts threaded on the ends of bolts 105 depending from the upper surface of the mask. These studs, which determine a line parallel to the back edge of the aperture 90, form marginal guides for the back edge of a sensitized sheet placed on surface 88 in the same manner as the studs 37 and 63 of the other easels.

Figure 18:
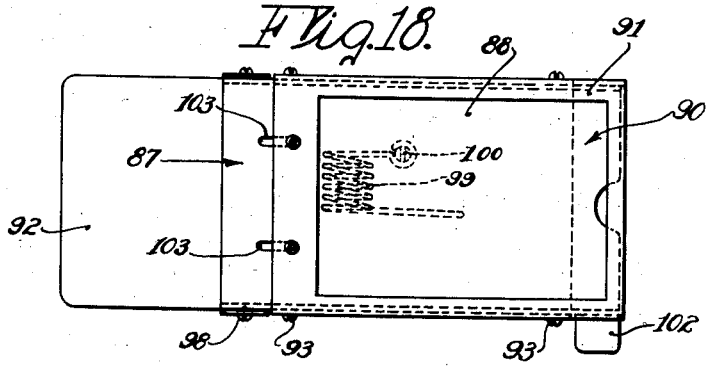
Fig. 18 is a top plan view thereof.
Figure 19:
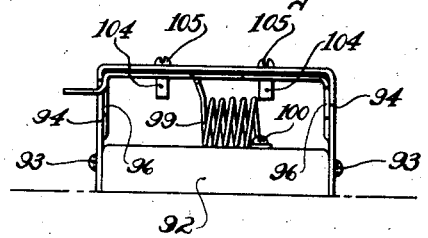
Fig. 19 is an end view.

Referring to Figs. 16 and 18, when the bed is in its normal position, the slots 103 are positioned with their front edges against the studs 104 as shown. However, if the bed is pressed downwardly, as it rotates around screws 98, the front edges of the slots move away from the studs. Then when a sheet 40 of sensitized paper is placed on the bed with its rear edge against the studs 104 as in Fig. 17 and pressure released on the finger piece 102, the paper will be moved forward along the bed to the edges of the slots 103 as the bed moves to its normal position of Fig. 16. In this manner, these studs 104 act to present a constantly advancing abutment to the back edge of a sheet as do the studs 37 and 63 of the other forms of easel and always move the back edge of successive sheets to the same position on the bed.

As was stated earlier, the use of this type of easel is most convenient where a large number of prints are to be made, and in order to further facilitate its use in this manner, I have made a special clamping means by which it may be secured in any position desired under the enlarger and which because of the novel arrangement, has a particular utility. In disclosing this clamping means, I have used for the purposes of illustration, the easel shown in Fig. 2.

Referring to Fig. 1, the base 106 of an enlarger is shown mounted on a bed 107. The enlarger (not shown) is adjusted vertically on the usual post 108 as desired. Adjacent to but located back of the forward edge of the post I place two studs 109 and 110, one on each side of the base and threaded to receive a wing nut 111. These studs 109 and 110 are of the correct diameter to fit a slot 112 cut in a long clamping member 113. This clamping member is supported at one end on the bed 107 by a rest 114 in the form of a rectangular block of substantially the same thickness as the base 23 of the easel. The rest is unattached to the bed and is slidably attached to the clamping member 113 by a U-shaped clip 115 which is attached at one end to the rest by any suitable means such as screws 116. The other end of the clamping member rests on the base 23 of the easel and when pressure is applied on the clamping member by turning down the wing nut 111 the easel is securely clamped in position. The particular feature of this arrangement is that, due to the provision of the long slot 112 in the clamping member 113 and the positioning of the studs 109 and 110 back of the forward edge of the post 108, the easel can be moved about under the enlarger over the entire area of projection on the base, including a position of the easel directly in line with the front edge of the post.

What I claim is:

1. An easel for projection printing comprising a bed having a surface to support a sensitized paper, a masking member having a surface complementary to the surface of said bed and an opening exposing a portion of the surface of the bed the edges of said opening defining the boundaries of the image to be printed on the sensitized paper, marginal guides depending from the masking member closely adjacent the boundaries of the opening to form the back and sides of an area corresponding to a piece of sensitized paper to be placed on the surface of the bed, and a pivot journaling the mask to the bed and having its axis parallel to the front boundary of the area and located below the masking member and beyond said back marginal guide, said back marginal guide having a depth sufficient for it to extend across the plane of the bed surface in all operative relative positions of the bed and mask.

2. An easel for projection printing comprising a bed having a surface to support a sensitized paper, a masking member having a surface complementary to the surface of said bed and an opening exposing a portion of the surface of the bed the edges of said opening defining the boundaries of the image to be printed on the sensitized paper, marginal guides depending from the masking member closely adjacent the boundaries of the opening and forming at their junction with the surface of the masking member an area corresponding to a piece of sensitized paper to be placed on the surface of the bed, said marginal guides for the sides of said area forming an angle with the surface of said masking member and flaring outwardly, and a pivot journaling the masking member to the bed and having its axis parallel to the front boundary of the area, and located below the masking member and beyond the back marginal guide.

3. An easel for projection printing comprising a bed having a surface to support a sensitized paper, a masking member having a surface complementary to the surface of said bed and an opening exposing a portion of the surface of the bed, said opening being formed of a plurality of mutually adjustable frame members forming the front, back and sides of the opening, marginal guides depending from the back and side frame members to form the back and sides of an area corresponding to a piece of sensitized paper to be placed on the surface of the bed, and a pivot journaling the masking member to the bed and having its axis parallel to the front boundary of the area and located below the masking member and beyond the back marginal guide, the bed being formed to receive the marginal guides when the masking member is turned about its pivot to the position where its surface is parallel to the surface of the bed.

4. A structure as claimed in claim 3 comprising means formed on the bed and additional means on the masking member cooperating therewith to limit the rotation of the masking member about its pivot to a range where the back marginal guide always intersects the plane of the bed.

5. An easel for projection printing comprising a base, a bed pivotally mounted on the base and having a surface to support a sensitized paper, a masking member fixedly supported on the base in superposed relation to the bed and having a surface complementary to the surface of the bed with an opening therein exposing a portion of the bed the edges of said opening defining the boundaries of the image to be printed on the sensitized paper, marginal guides depending from the masking member closely adjacent the boundaries of the opening to form the back and sides of an area corresponding to a piece of sensitized paper to be placed on the surface of the bed, the pivot line of the bed lying beyond and parallel to said marginal guide, and below the level of the surface of the bed when the bed is in normal printing position, said last named marginal guide having a depth sufficient for it to extend across the plane of the bed surface in all operative positions of the bed.

6. An easel for projection printing comprising a bed having a surface to support a sensitized paper, a masking member having a surface complementary to the surface of said bed and an opening exposing a portion of the surface of the bed, the edges of said opening defining the boundaries of the image to be printed on the sensitized paper, marginal guides depending from the masking member closely adjacent the boundaries of the opening to form the back and sides of an area corresponding to a piece of sensitized paper to be placed on the surface of the bed, and a pivot connecting the mask and bed for relative movement, said pivot having its axis parallel to the front boundary of the area and located below the masking member and beyond the back guide, said back marginal guide having a depth sufficient for it to extend across the plane of the bed surface in all operative relative positions of the bed and mask.

7. An easel for projection printing comprising a bed having a surface to support a sensitized paper, a masking member having a surface complementary to the surface of said bed and an opening exposing a portion of the surface of the bed, the edges of said opening defining the boundaries of the image to be printed on the sensitized paper, side marginal guides on one of said members and a back marginal guide depending from the mask, said marginal guides collectively forming the back and sides of an area corresponding to that of a piece of sensitized paper to be placed on the surface of the bed, and a pivot connecting the mask for relative movement, said pivot having its axis parallel to the front boundary of the area and located below the masking member and beyond said back marginal guide, said back marginal guide having a depth sufficient for it to extend across the plane of the bed surface in all operative relative positions of the bed and mask.

GEORGE G. MORIN.